(12) United States Patent
So

(10) Patent No.: US 6,915,973 B2
(45) Date of Patent: Jul. 12, 2005

(54) GRATING AND CUTTING APPARATUS

(76) Inventor: Kwok Kuen So, 2nd Floor, Chuan Yuan Factory Building, 342-344 Kwun Tong Road, Kwun Tong Kowloon (HK)

(*) Notice: Subject to any disclaimer, the term of this patent is extended or adjusted under 35 U.S.C. 154(b) by 60 days.

(21) Appl. No.: 10/291,684

(22) Filed: Nov. 12, 2002

(65) Prior Publication Data
US 2004/0079820 A1 Apr. 29, 2004

(30) Foreign Application Priority Data
Oct. 29, 2002 (GB) .............................................. 0225153

(51) Int. Cl.⁷ .......................... A01D 34/90; A47J 42/00; A47J 43/00
(52) U.S. Cl. .................. 241/169.1; 241/168; 241/285.2
(58) Field of Search .............................. 241/82.4, 82.5, 241/82.7, 93, 101.01, 169.1, 280, 285.2

(56) References Cited

FOREIGN PATENT DOCUMENTS

FR 2205296 A1 5/1974

Primary Examiner—Allen Ostrager
Assistant Examiner—Jason Y Pahng
(74) Attorney, Agent, or Firm—Leydig, Voit & Mayer, Ltd.

(57) ABSTRACT

Apparatus for severing small food pieces from larger food pieces, includes a barrel having a delivery opening through which the larger food pieces can be delivered to the barrel, and a dispensing opening through which the small food pieces can be dispensed. A rotating cutter having a number of blades is fitted into the barrel. A crank handle is attached to the cutter for rotating the cutter and an anvil is fitted within the barrel and has a number of slots into which the blades enter to sever the larger food pieces into the smaller food pieces.

9 Claims, 7 Drawing Sheets

GRATING AND CUTTING APPARATUS

BACKGROUND OF THE INVENTION

The present invention relates to a grating and cutting device. More particularly, although not exclusively, the invention relates to a hand-held device for use in the kitchen on one hand to grate solid food items such as cheese or carrots, and on the other hand to julienne lighter food such as parsley or other vegetables for example.

Cheese graters comprising a hand-held hopper, pressing plate and a manually rotated grating drum are known. These comprise something similar in overall structure to the device depict in FIG. 1 of the accompanying drawings in which there is a hopper 11 to deliver cheese blocks to a grating drum 19 that is rotated within a barrel 12 by a crank handle 16. A handle 13 extends from the barrel and there is hingedly attached to the handle via an arm 14 a pressing plate 15 to press the cheese block down upon the grate.

The above-described devices work well on solid food articles such as cheese or carrots for example. However, they are useless for julienning soft vegetables such as parsley for example.

OBJECTS OF THE INVENTION

It is an object of the present invention to overcome or substantially ameliorate disadvantages of the prior art and/or more generally to provide a grating device that can also be used for cutting or julienning.

DISCLOSURE OF THE INVENTION

There is disclosed herein apparatus for severing small food pieces from larger food pieces, the apparatus comprising:

a barrel having a delivery opening through which the larger food pieces can be delivered to the barrel, and a dispensing opening through which the small food pieces can be dispensed;

a rotating cutter fitted into the barrel;

a driver for rotating the cutter; and an anvil fitted within the barrel and having a slot into which at least a part of the rotating cutter enters to sever the larger food pieces into the smaller food pieces.

Preferably the driver is a crank handle attached to the cutter.

Preferably the cutter and the anvil are mounted to a carriage that is removably keyed into the barrel so as not to rotate therein.

Preferably the cutter comprises a shaft having a plurality of blades extending radially therefrom.

Preferably the anvil comprises a plurality of said slots parallel to one another.

Preferably the anvil is in the form of a plate.

Preferably the anvil is removable from the carriage.

Preferably the plate has a number of tabs extending into slots in the carriage to attach the plate to the carriage.

Preferably the apparatus further comprises a hopper extending from the delivery opening and through which the larger food pieces are delivered to the barrel.

Preferably the barrel has an inner wall having a key slot adjacent an end opening thereof and wherein the carriage has a key that fits into the key slot to prevent rotation of the carriage when fitted into the barrel.

Preferably a handle extends radially from the barrel and an arm is hingedly attached to the handle, the arm having attached pivotally thereto a pressing plate that moves toward the delivery opening.

Preferably a grating drum having extending radially therefrom a crank handle, can be installed into the barrel to replace the cutter, anvil and carriage.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

Figure 1:
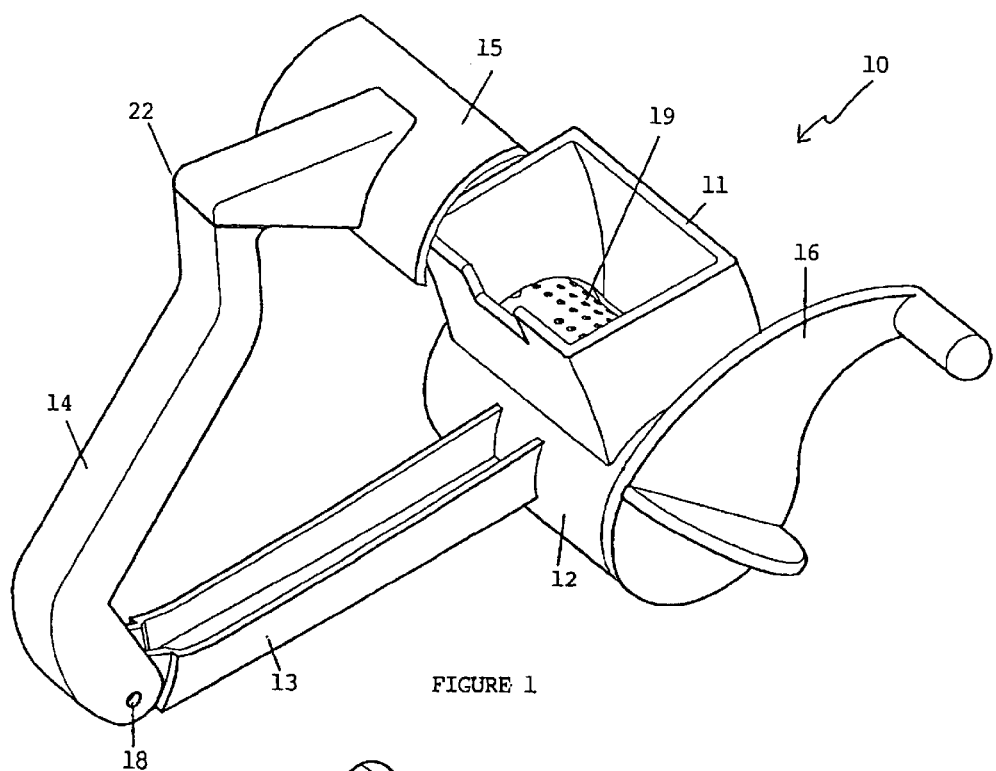
FIG. 1 is a schematic perspective illustration of a food grating and cutting apparatus having its pressing plate in a raised configuration.
Figure 2:
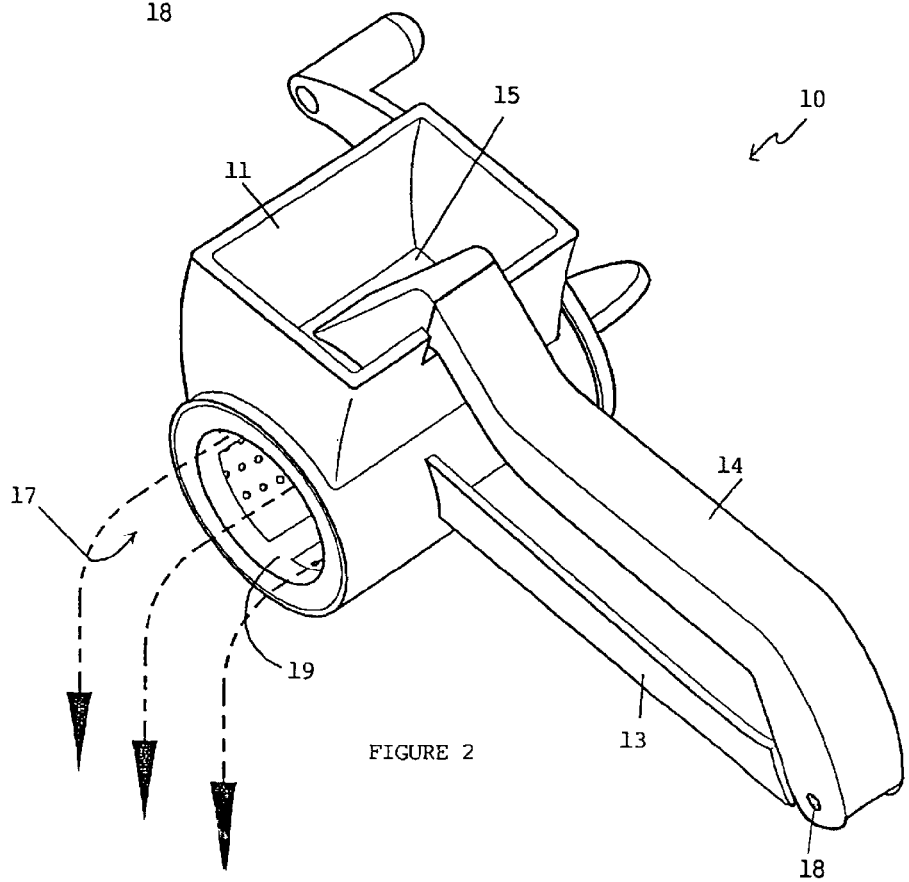
FIG. 2 is a schematic perspective illustration of the apparatus of FIG. 1 from another angle showing the pressing plate in the lowered configuration.
Figure 3:
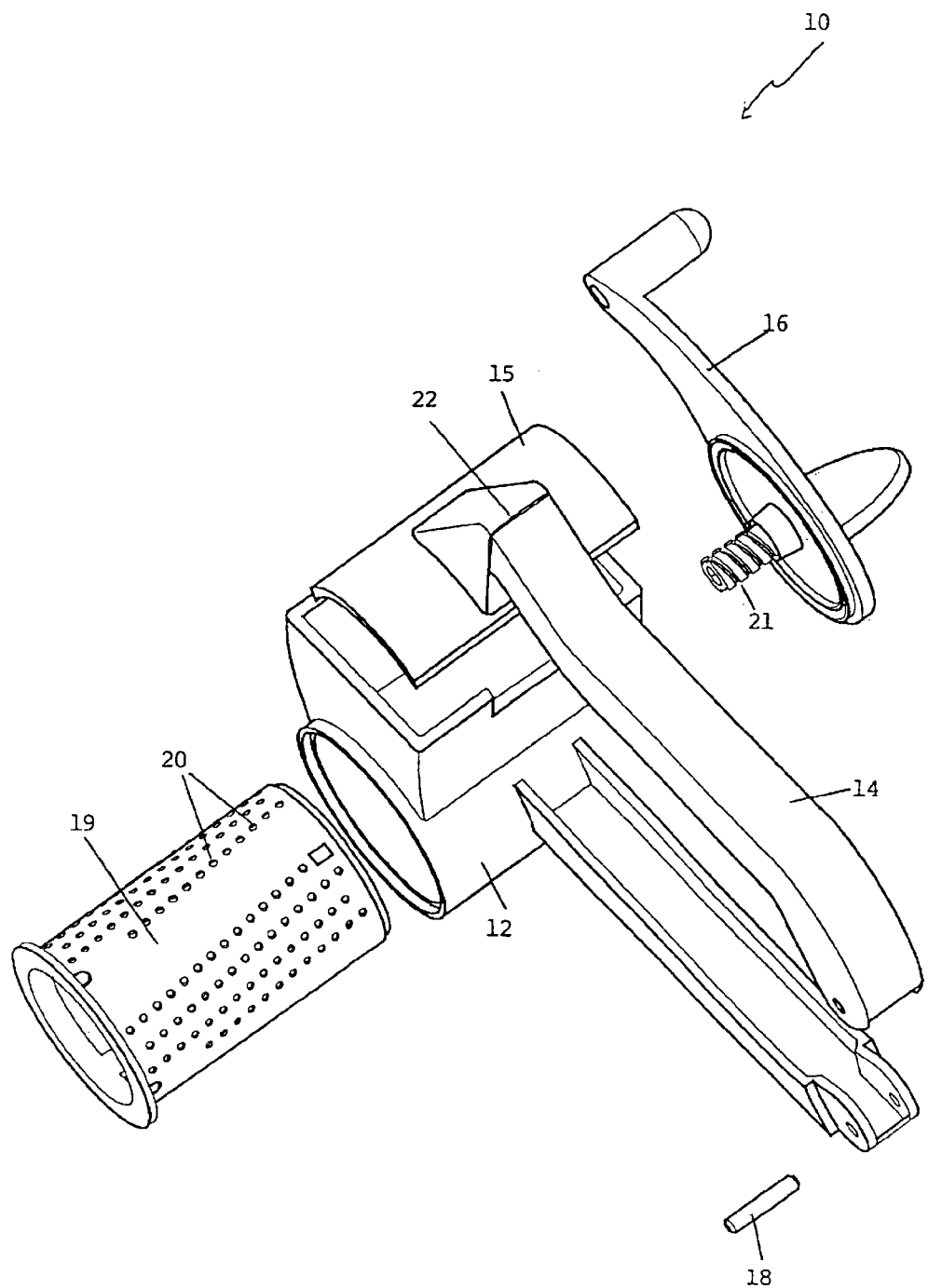
FIG. 3 is a schematic parts-exploded perspective illustration of the apparatus of FIGS. 1 and 2.
Figure 5:
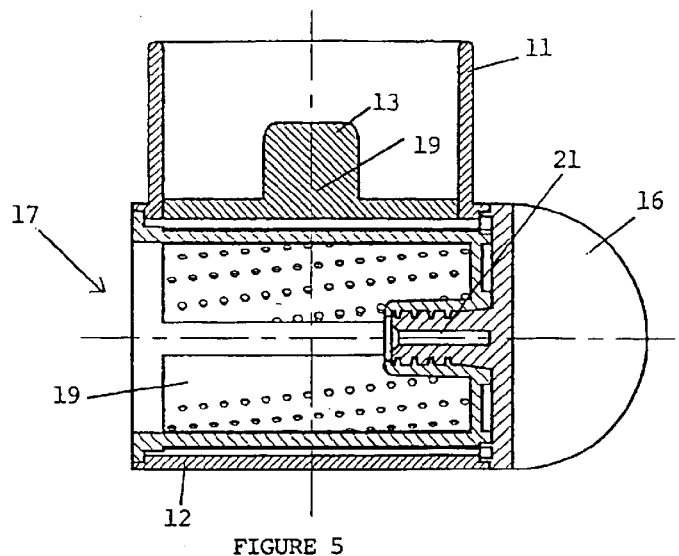
FIG. 5 is a schematic cross-sectional elevational view of the apparatus taken at V—V in FIG. 4.
Figure 4:
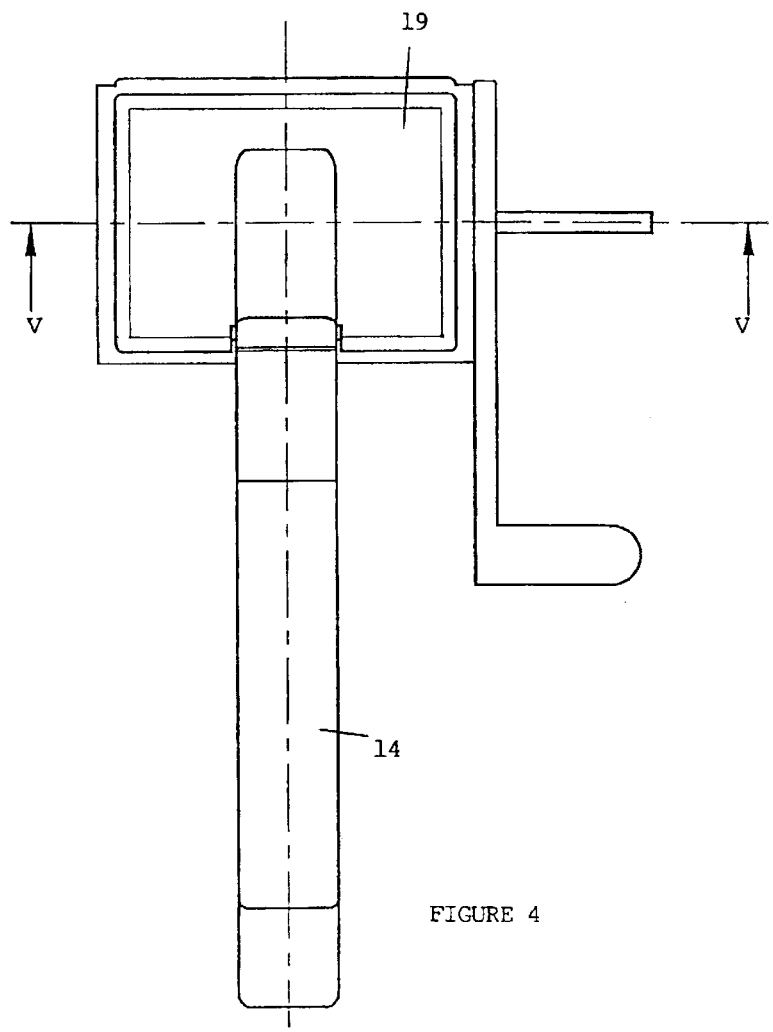
FIG. 4 is a schematic plan view of the food grating and cutting apparatus.
Figure 6:
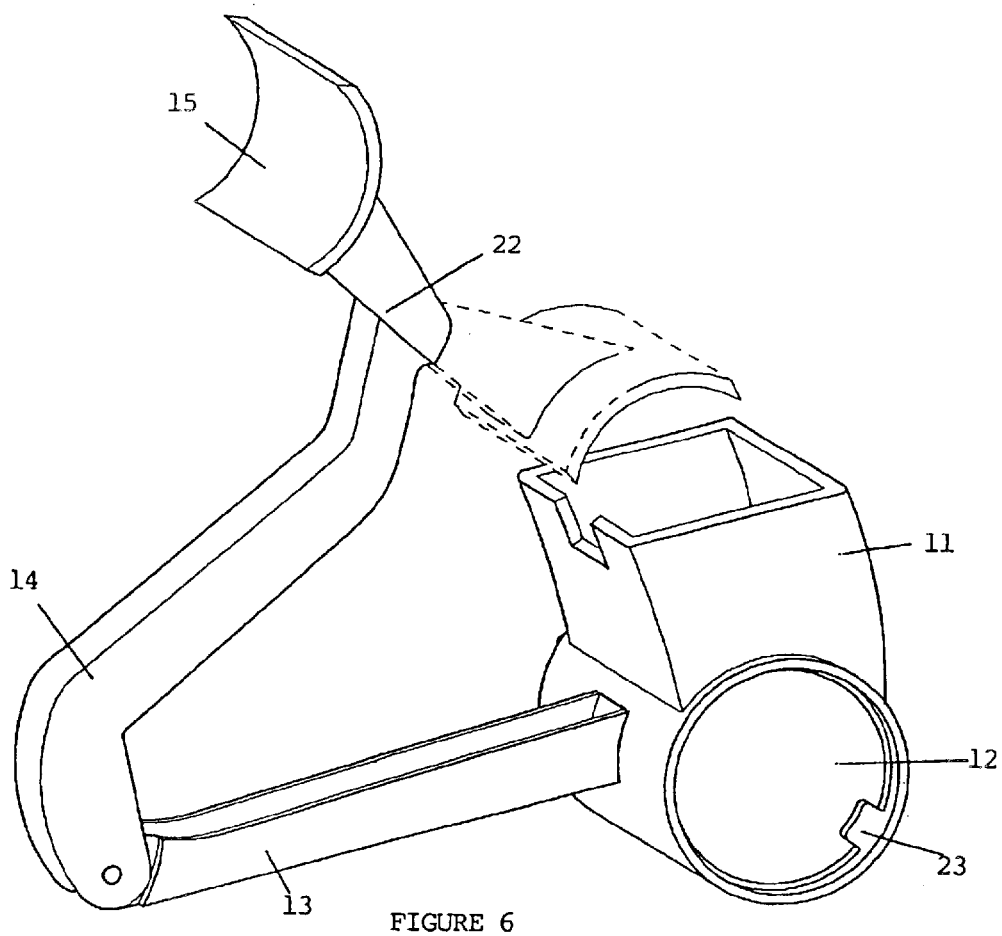
FIG. 6 is a schematic perspective illustration similar to FIG. 1, but with some of its components removed to be replaced by others, and with its pressing plate pivoted out of the way.
Figure 7:
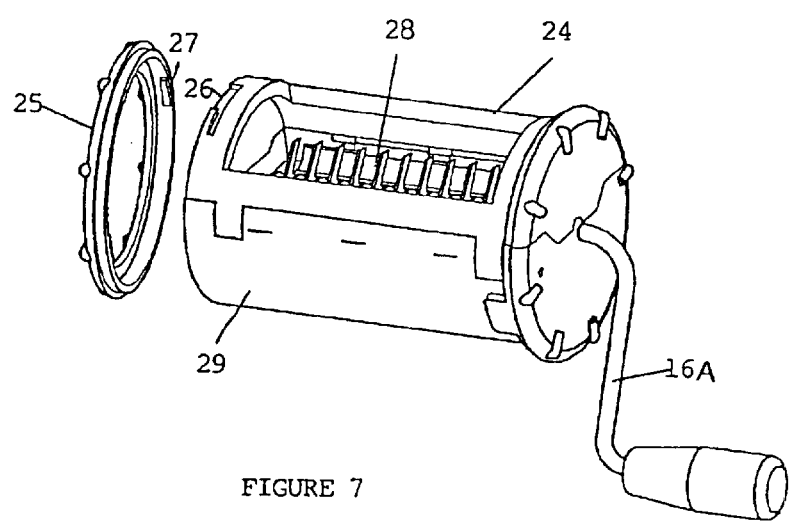
FIG. 7 is a schematic perspective illustration of a carriage having a cutter therein to replace the removed parts in the apparatus of FIG. 6.
Figure 8:
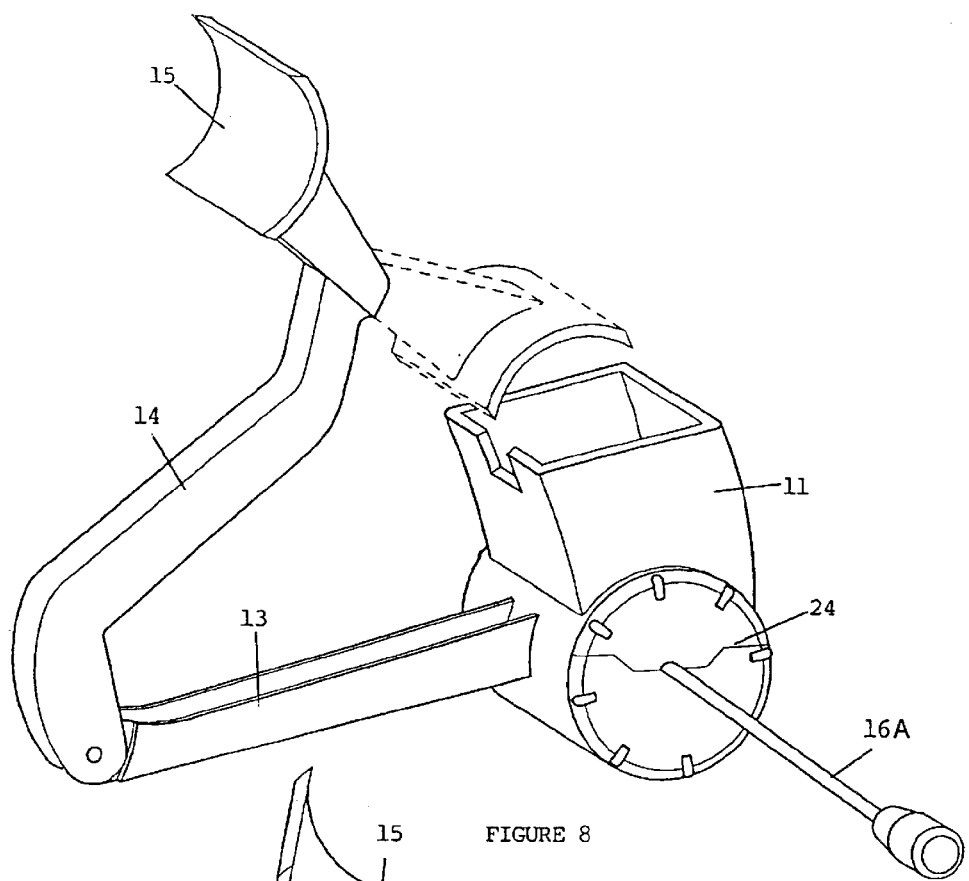
FIG. 8 is a schematic perspective illustration of the apparatus having the carriage and cutter installed.
Figure 9:
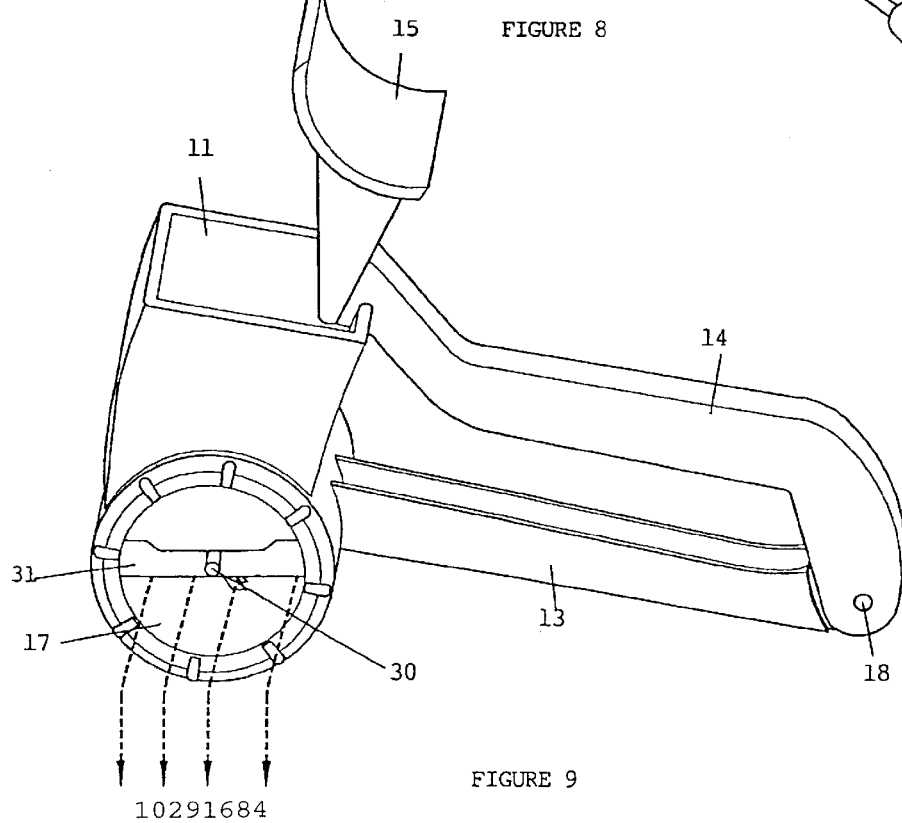
FIG. 9 is a schematic perspective view of the device of FIG. 8 from a different angle.
Figure 10:
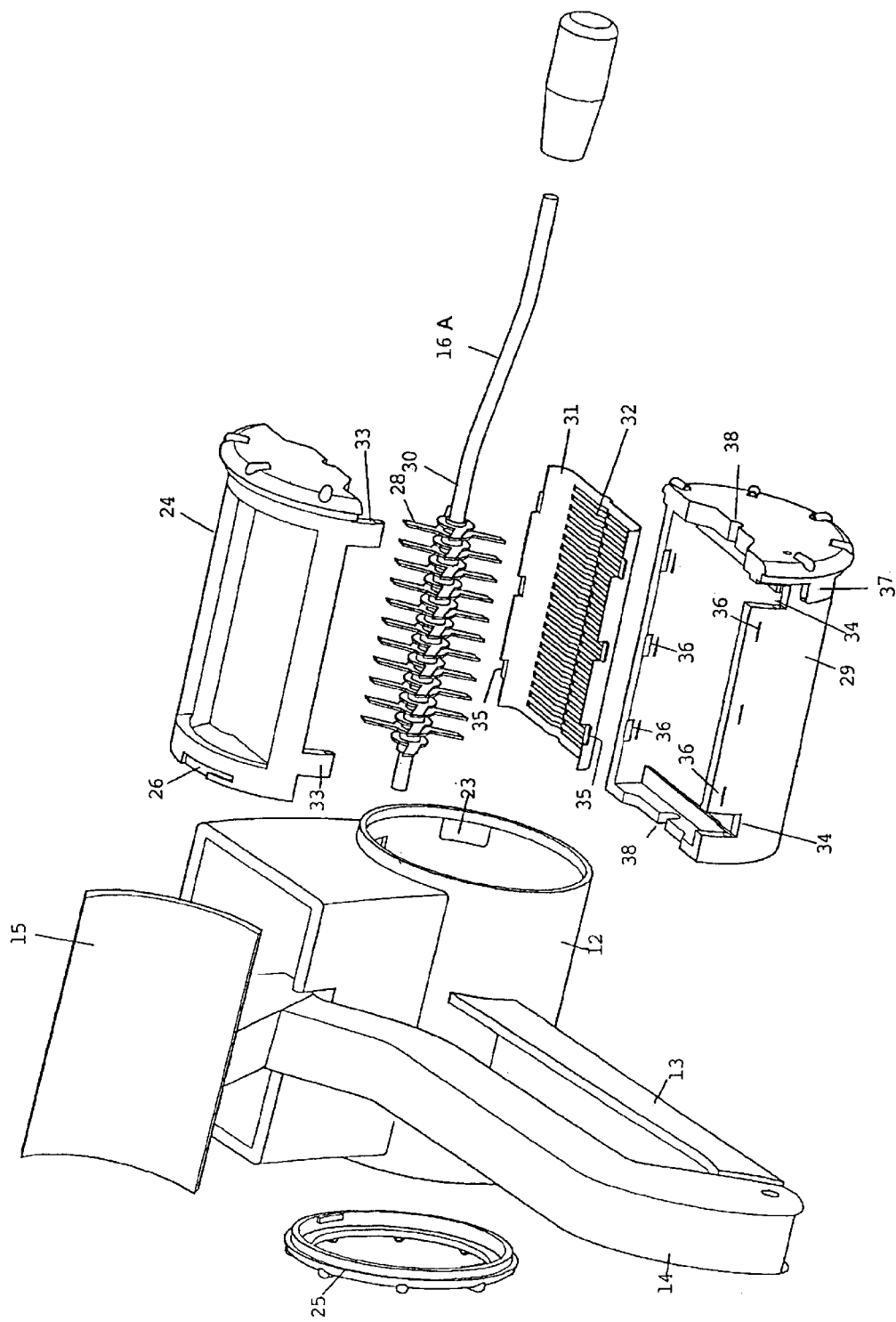
FIG. 10 is a schematic parts-exploded perspective illustration of the apparatus of FIGS. 8 and 9.
Figure 11:
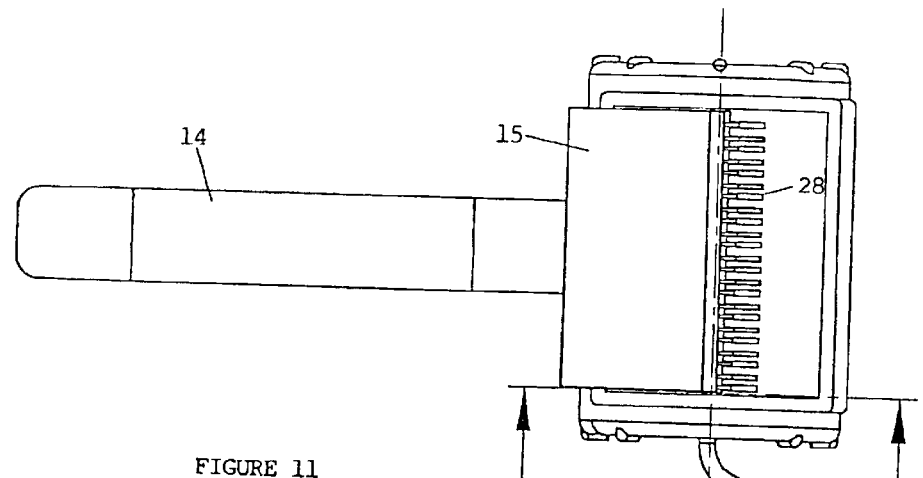
FIG. 11 is a schematic plan view of the apparatus of FIGS. 8 and 9.
Figure 13:
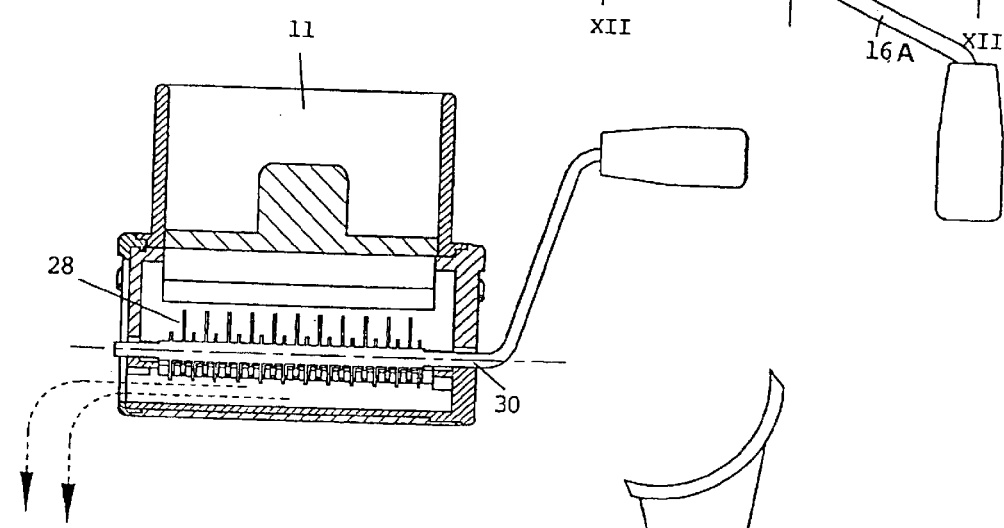
FIG. 13 is a schematic cross-sectional elevational view of the apparatus taken at XIII—XIII in FIG. 12.
Figure 12:
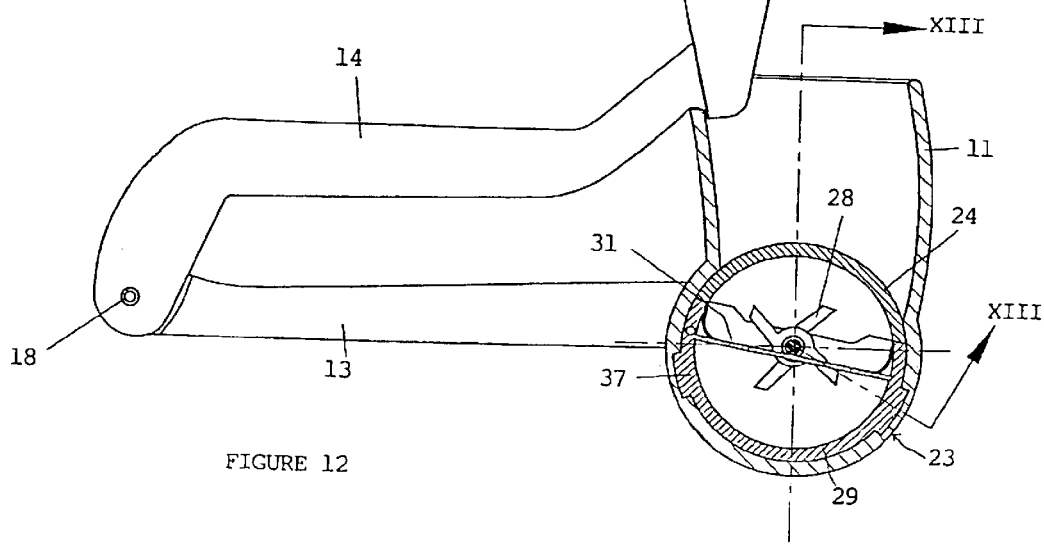
FIG. 12 is a schematic cross-sectional elevational view of the apparatus taken at XII—XII in FIG. 11.

In FIGS. 1 to 4 of the accompanying drawings there is depicted schematically an apparatus 10 configured and with parts inserted enabling the apparatus to be used as a grater for cheese or other hard food such as carrots. The apparatus 10 comprises a barrel 12 having extending upwardly therefrom a hopper 11. There is a handle 13 extending radially from the barrel 12. There is an arm 14 hingedly attached at hinge pin 18 to the handle 13. The apparatus is typically made of moulded plastics material or cast metal. Pivotally mounted at 22 to the arm 14 is a pressing plate 15. When the arm 14 pivots about hinge pin 18, the pressing plate 15 can press a piece of cheese or carrot or other food item into the hopper 11 to be presented to a grating drum 19. There is an outlet 17 communicating with the interior of the grating drum 19 and through which grated cheese for example is dispensed as illustrated by the arrows. The drum 19 has connected to it a crank handle 16. To this end, the crank handle 16 has a threaded shaft 21 that is received within a threaded recess of the drum 19 as illustrated in FIG. 5. The drum 19 has a plurality of slicing apertures 20 through which the food is extruded to the barrel interior for dispensation.

The crank handle 16 and drum 19 can be removed from the barrel 12 to make way for alternative components as shown in FIGS. 7 to 12.

In FIGS. 6 to 12 of the accompanying drawings there is depicted schematically an apparatus whose drum 12, handle 13, arm 14 and pressing plate 15 are common to the embodiment of FIGS. 1 to 5. However, the pressing plate 15 is pivoted about pivot point 22 to an out-of-the-way position.

A carriage 29 houses a cutter and an anvil. The cutter comprises a shaft 30 being an extension of crank handle. 16A from which a plurality of metallic blades 28 radiate. These are typically made of stainless steel. The blades 28 are fixed to the shaft. The anvil 31, typically formed as a pressing of stainless steel includes a plurality of parallel slots 32 through which the blades 28 pass as they rotate upon movement of crank handle 16. The anvil includes a number of plate tabs 35 received within recesses 36 formed on the inside of the carnage 29. The carriage 29 includes alignment openings 34 into which alignment tabs 33 of the cover 24 are received. The shaft 30 is supported in bearing apertures 38 of the carriage 29.

The barrel 12 has adjacent its end a number of key way slots 23. These receive keys 37 of the carriage 29 to ensure that the carriage 29 does not rotate within the barrel 12 upon rotation of the crank handle 16A.

Upon rotation of the crank handle 16A by hand, the shaft 30 rotates so that the blades 28 extend into and move along the slots 32 in the anvil 31. If soft food such as parsley or other herbs is presented through the hopper to the blades 28, they are cut through the slots 32 to be presented to a space beneath the anvil 31 to be dispensed through outlet 17 as shown by the arrows in FIG. 9.

It should be appreciated that modifications and alterations obvious to those skills in the art are not to be considered as beyond the scope of the present invention. For example, the cranks 16 and 16A might be replaced by an electric motor in a powered device.

What is claimed is:

1. An apparatus for severing small food pieces from larger food pieces, the apparatus comprising:

a barrel having a delivery opening through which larger food pieces can be delivered to the barrel, and a dispensing opening through which smaller food pieces can be dispensed;

a rotating cutter fitted into the barrel;

a driver for rotating the cutter;

a carriage located within and removably keyed to the barrel so as not to rotate relative to the barrel;

an anvil fitted within the barrel and having a slot into which at least a part of the rotating cutter enters to sever the larger food pieces into the smaller food pieces, wherein the cutter and the anvil are mounted to the carriage;

a handle extending radially from the barrel;

an arm hingedly attached to the handle; and a pressing plate pivotally attached to the arm for movement toward the delivery opening upon hinged movement of the arm relative to the handle.

2. The apparatus of claim 1 wherein the driver is a crank handle attached to the cutter.

3. The apparatus of claim 1 wherein the cutter comprises a shaft having a plurality of blades extending radially from the shaft.

4. The apparatus of claim 3 wherein the anvil comprises a plurality of the slots parallel to one another.

5. The apparatus of claim 3 wherein the anvil is a plate including the plurality of slots.

6. The apparatus of claim 1 wherein the anvil is removable from the carriage.

7. The apparatus of claim 5 wherein the plate has a number of tabs extending into apertures in the carriage to attach the plate to the carriage.

8. The apparatus of claim 1 further comprising a hopper extending from the delivery opening and through which the larger food pieces are delivered to the barrel.

9. The apparatus of claim 1 wherein the barrel has an inner wall having a key slot adjacent an end opening of the barrel and the carriage has a key that fits into the key slot to prevent rotation of the carriage relative to the barrel when the carriage is fitted into the barrel.

* * * * *